No. 630,008. Patented Aug. 1, 1899.
A. C. & J. O. SHIMER.
WIRE WORKING MACHINE.
(Application filed Sept. 3, 1898.)

(No Model.) 10 Sheets—Sheet 1.

Fig. 1.

WITNESSES:
Edwin J. McKee
G. M. Anderson

INVENTORS
Jno. O. Shimer
A. C. Shimer
by E. W. Anderson
their
ATTORNEY.

No. 630,008. Patented Aug. 1, 1899.
A. C. & J. Q. SHIMER.
WIRE WORKING MACHINE.
(Application filed Sept. 3, 1898.)
(No Model.) 10 Sheets—Sheet 2.

WITNESSES:
Edwin G. McKee
G. M. Anderson

INVENTORS
Jno. Q. Shimer
A. C. Shimer
BY
E.W. Anderson
their ATTORNEY.

No. 630,008. Patented Aug. 1, 1899.
A. C. & J. Q. SHIMER.
WIRE WORKING MACHINE.
(Application filed Sept. 3, 1898.)

(No Model.) 10 Sheets—Sheet 3.

WITNESSES:
Edwin F. McKee
G. M. Anderson

INVENTORS.
Jno. Q. Shimer.
A. C. Shimer.
by E. W. Anderson
their
ATTORNEY.

No. 630,008. Patented Aug. 1, 1899.
A. C. & J. Q. SHIMER.
WIRE WORKING MACHINE.
(Application filed Sept. 3, 1898.)

(No Model.) 10 Sheets—Sheet 8.

WITNESSES:
Edwin J. McKee
G. M. Anderson

INVENTORS
Jno. Q. Shimer
A. C. Shimer
BY
E. W. Anderson
their ATTORNEY.

No. 630,008. Patented Aug. 1, 1899.
A. C. & J. Q. SHIMER.
WIRE WORKING MACHINE.
(Application filed Sept. 3, 1898.)
(No Model.) 10 Sheets—Sheet 9.

WITNESSES:
Edwin G. McKee
G. M. Anderson

INVENTORS
Jno Q. Shimer
A. C. Shimer
BY
E. W. Anderson
their
ATTORNEY.

UNITED STATES PATENT OFFICE.

ALLEN C. SHIMER AND JOHN Q. SHIMER, OF ANDERSON, INDIANA.

WIREWORKING-MACHINE.

SPECIFICATION forming part of Letters Patent No. 630,008, dated August 1, 1899.

Application filed September 3, 1898. Serial No. 690,209. (No model.)

*To all whom it may concern:*

Be it known that we, ALLEN C. SHIMER and JOHN Q. SHIMER, citizens of the United States, residing at Anderson, in the county of Madison and State of Indiana, have invented certain new and useful Improvements in Wireworking Machines; and we do declare the following to be a full, clear, and exact description of the invention, such as will enable others skilled in the art to which it appertains to make and use the same, reference being had to the accompanying drawings, and to figures and letters of reference marked thereon, which form a part of this specification.

This invention has relation to a machine or loom for making or weaving wire fabric or fencing of a certain character; and it is designed to provide a machine of this class which is capable of being operated in an efficient and practical manner for the rapid manufacture of such fabric or fencing.

The invention consists, first, in means for taking the wires for the several horizontal or runner wires of the fencing from spools, reels, coils, or bales and corrugating them; second, in means for taking the wire for the vertical tie or stay wires from suitable spools or reels, for forming in the same a number of loops, corresponding in number to the number of the horizontal or runner wires, for cutting said wire at the proper point, for transferring the stay or tie so formed to a position on the machine where it can be applied to the previously-corrugated horizontal or runner wires, and for wrapping the loops thereof around said runner-wires; also, in means for winding the finished fencing in a proper manner upon a drum or reel into suitable bales.

The invention also consists in the novel construction and combination of parts, all as hereinafter described, and pointed out in the appended claims.

In the accompanying drawings, Fig. 3 is a section on the line $a\,a$ of Fig. 2, with the transfer-plate in position on the loop-forming pins and the movable grip-plate in raised position. Figs. 17 and 18 are perspective detail views showing the operation of the vertically-reciprocating wire-grip. Fig. 30 is a detail perspective view of one of the wire-holding spools or reels.

In order to simplify the drawings and to enable the same to be made upon a somewhat larger scale, we illustrate a machine capable of making fencing having six or less runner-wires; but in the machines which we have heretofore built and operated provision is made for the manufacture of a fencing containing twelve or less runner-wires, and the machines may be constructed in accordance with our invention adapted for any desired number above twelve. This, however, involves no change from the machine illustrated beyond the reduplication of parts to provide for additional wires.

Referring more particularly to the drawings, the numeral 1 designates the main frame of the machine, which is of suitable character and construction to provide proper support and bearing for the operative parts hereinafter described.

2 designates a series of wire-holding spools or reels which are journaled upon a rearward extension of the frame 1, or upon a separate and independent frame 3, or upon any suitable support. One of these reels or spools is provided for each runner-wire of the fencing to be formed, and in the construction shown they consist each of a central wheel or disk having secured thereto a number of radial forked arms 4, which receive and hold the coil or bale of wire. One branch or furcation 5 of two of the arms of each reel is pivoted as indicated at 6, Fig. 30, and is secured by a removable pin 7. When this pin is withdrawn, the part 5 may be turned down on its pivot to facilitate the insertion of the coil in the series of arms of the reel or spool.

8 designates a drum or cylinder journaled on the frame 1 and around which the wires from the several spools or reels first pass after leaving the latter.

9 designates tension wheels or rollers which bear against the several wires where they pass around the said drum or cylinder. These rollers are each carried by a pivoted lever 10, acted upon by a spring 11, which holds the roller in contact with the wire on said drum or cylinder. The purpose of this drum or cylinder and the rollers is to keep the several wires under tension and to assure their uniform advance through the machine, so that all the wires will be equally taut in the finished fabric. (See Fig. 3.)

Figure 2:
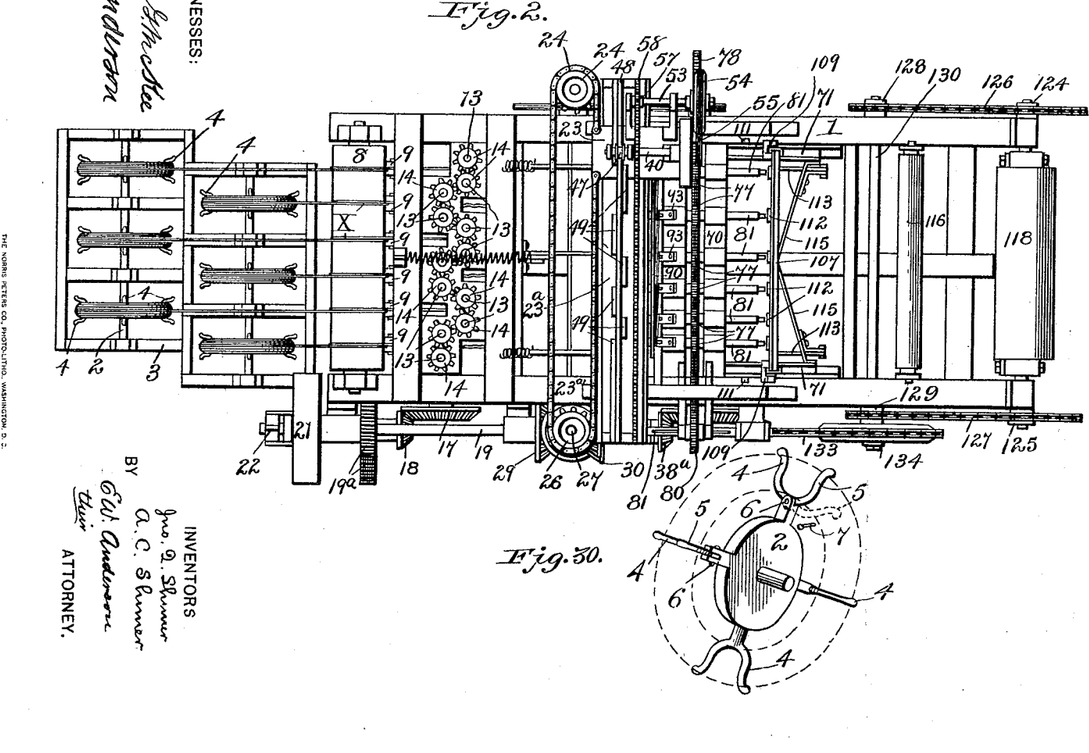
Fig. 2 is a plan view of the complete machine.
Figures 24, 25, 26, 27, 28:
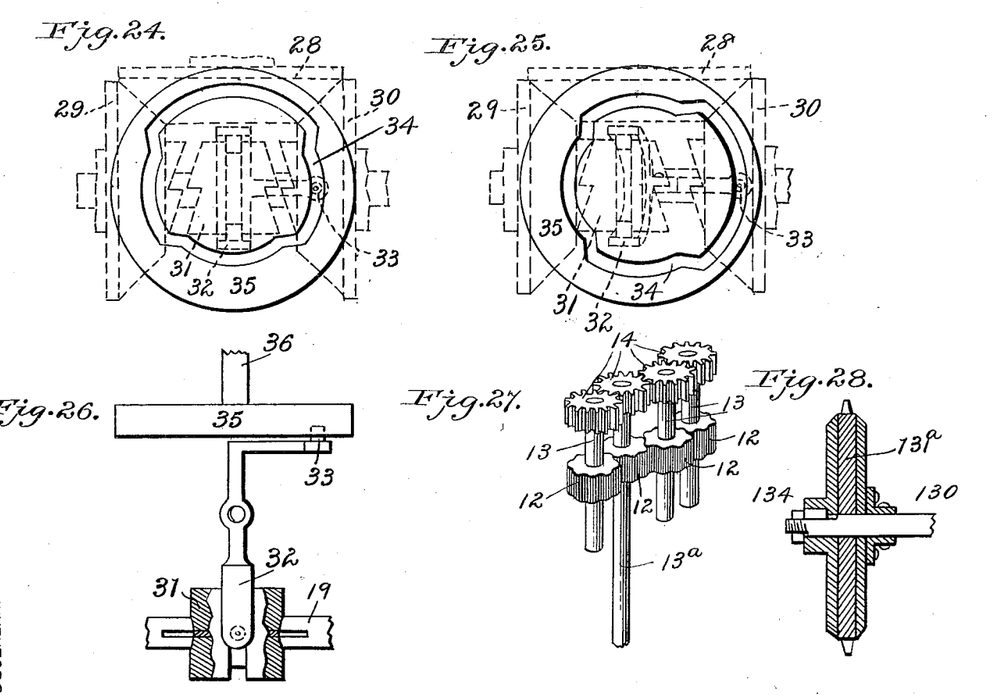
Figs. 24 and 25 are detail views showing the reversible driving-gear for the looper-carriage and the twister-actuating devices, the slidable clutch-sleeve which controls the same, and the cam which operates said sleeve, the sleeve and cam being shown in different positions in the two views.
Fig. 26 is a detail view, partly in plan and partly in section, showing the connection between the cam and the said clutch-sleeve.
Fig. 27 is a detail perspective view of two pairs of the intergeared corrugating-wheels and their driving-pinions.
Fig. 28 is a detail view of the compound friction driving-wheel for the winding reel or cylinder.

12 designates the corrugating devices, which consist of small corrugated wheels carried on short vertical shafts 13. They are arranged in two series, one a little behind the other, in pairs in each series, one pair for each runner-wire, as best shown in Figs. 2 and 27, and intergear with each other. The shafts 13 are also intergeared by means of a series of small toothed wheels or pinions 14. The shaft 13$^a$ of one of the said pinions (a central one) is extended down to a transverse shaft 15, to which it is connected by bevel-gear driving-wheels 16. If desired, the shafts 13 of the end pinions may also be extended down and geared to the shaft 15 in a similar manner. The shaft 15 at one end has a bevel gear-wheel 17, which is driven by a bevel-pinion 18 on a counter-shaft 19, journaled in bearings at one end of the machine and geared by wheels 19$^a$ to the main driving-shaft 20.

21 is a belt wheel or pulley on the shaft 20, and 22 is a clutch device for throwing said wheel into and out of operation.

The parts thus far described constitute the means for feeding and corrugating the runner-wires, and we will now proceed to describe the means for forming and applying the tie or stay wires.

Figures 8, 9:
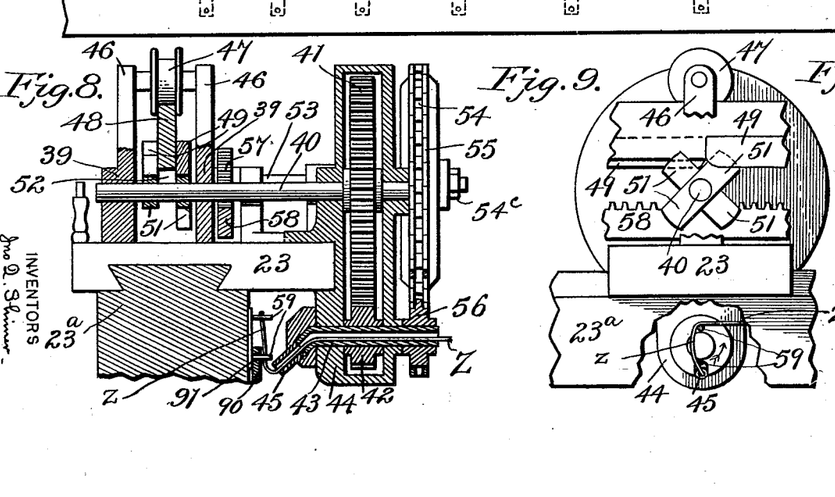
Fig. 8 is a detail sectional view showing the looper and its actuating devices.
Fig. 9 is a detail view further illustrating the operation of the looper.

23 designates a carriage which is fitted to reciprocate on a transverse way or guide 23$^a$ at the upper portion of the machine, above and forward of the corrugating-wheels. 24 is a sprocket-chain whose ends are connected to opposite end portions of the said carriage and which is carried by the two sprocket-wheels 25 and 26. The sprocket-wheel 25 is an idle-wheel, while the wheel 26 forms the driver for said chain, being rigidly mounted on the upper end portion of a vertical shaft 27, at whose lower end portion is a bevel gear-wheel 28, which is located between and designed to mesh with two bevel gear-wheels 29 and 30, loosely mounted upon the counter-shaft 19 above referred to and adapted to be alternately thrown into driving connection with said shaft by means of an interposed slidable clutch-sleeve 31. Connected to said sleeve is a shifting lever 32, whose opposite arm has a stud or roller 33, which engages the groove 34 of a cam 35, (see Figs. 24 and 25,) rigidly mounted on a transverse shaft 36, which we call the "time-shaft" of the machine, and which is driven by a gear connec-37 with a parallel shaft 38, which is geared in turn to the counter-shaft 19, as indicated at 38$^a$. (See Fig. 2.) Mounted in bearings 39 on the carriage 23 is a shaft 40, having at one end a gear-wheel 41, whose teeth mesh with the teeth of a pinion 42. The pinion 42, which we term the "looper pinion or wheel," has one tooth to every four teeth on the gear-wheel 41 and is given a complete rotation by a one-fourth rotation of said gear-wheel. Said pinion has a tubular shaft or axle 43, which is journaled in a head or casing 44, which incloses said gear-wheel and pinion, and the inner end of said shaft is bent, as shown at 45, Figs. 3 and 8, to form a looping device.

Figure 7:
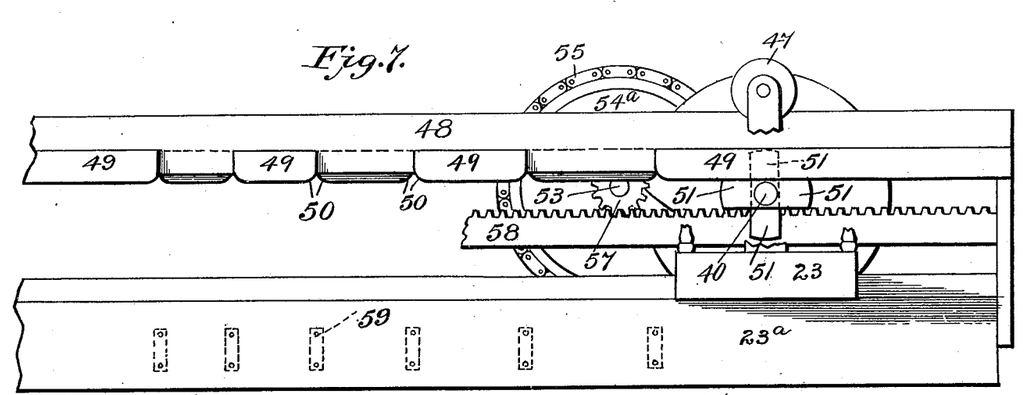
Fig. 7 is an elevation of a portion of the machine and illustrating the operation of the looper-actuating device.

The carriage 23 carries a bracket 46, upon which is journaled a roller 47, which as the carriage moves runs upon an edgewise-disposed transverse plate 48, supported by the main frame above the way or guide 23$^a$. Secured to opposite sides of said plate are horizontal lugs or blocks 49, having beveled or rounded end portions 50. One of these blocks is provided for each runner-wire of the fencing, one-half the number being upon one side of said plate and the other upon the opposite side and in alternating position with respect to those upon the other side. (See Figs. 2 and 7.)

On the shaft 40, which carries the gear-wheel 41 above described, are four arms 51, which "quarter" or stand at ninety degrees to each other, two of said arms being upon the same side of the plate 48 as the gear-wheel 41, while the other two arms are upon the opposite side of said plate, the latter being raised sufficiently above the way or guide $23^a$ to form a space 52, through which the end portion of the shaft 40 extends. As the carriage moves along said way or guide, propelled by the chain 24, the two arms 51, which are in horizontal alinement with each other, slide underneath a lug or block 49 upon one side of the plate 48, during which time the other two arms are in vertical position and are between adjacent lugs or blocks upon the opposite side of said plate. As soon, however, or very shortly after the horizontal arms pass out from under that lug the upper vertical arm 51 comes in contact with the beveled or rounded end 50 of the adjacent lug or block 49, and by such impingement said arm is moved to horizontal position, passes under the contacting lug, and rotates the shaft 40 a one-fourth revolution, thereby bringing the arms 51 upon the opposite side into vertical position. This operation is repeated and the shaft 40 and gear-wheel 41 are given a one-fourth revolution each time one of said arms 51 contacts with one of the said blocks or lugs 49. The operation will be clearly understood by reference to Figs. 7, 8, and 9. Each one-fourth revolution of the wheel 41 causes a complete revolution of the pinion 42, as above stated.

Figure 10:
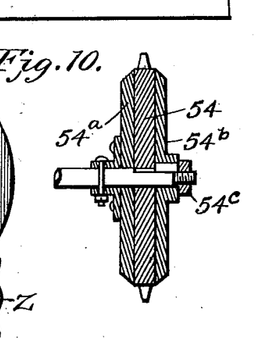
Fig. 10 is an edge view of the compound friction and sprocket wheel.

Although we do not consider it as absolutely essential, we prefer to employ the following devices for the purpose of assisting the revolution of the gear-wheel 41 to prevent any jar or strain due to the contact of the arms 51 with the blocks or lugs 49. These devices consist of a shaft 53, mounted upon the carriage 24 and carrying a compound friction and sprocket wheel 54, which is connected by a chain 55 with a small sprocket-wheel 56 on the tubular axle of the pinion 42. The shaft 53 also carries a pinion 57, whose teeth run in a transverse rack 58, secured to the frame just above the way or guide $23^a$. The wheel 54 (see Fig. 10) consists of a section $54^a$, fast on the shaft 53, a section $54^b$, which is also fast upon the said shaft, and an interposed friction sprocket-disk, to which the numeral 54 is applied. A nut $54^c$ is provided whereby the friction between the said parts may be adjusted. As the carriage traverses the way $23^a$ the engagement of the pinion 57 with the rack 58 causes the rotation of the shaft 53 and wheel-section 54. As long as the arms 51 of the shaft 40 are in engagement with one of the lugs or blocks 49 wheel 41 cannot of course turn, and therefore the sprocket-disk 54 is also prevented from turning, so that the wheel-sections $54^a$ and $54^b$ slip thereon. As soon, however, as the said arms 51 pass out of engagement with one of the blocks 49 wheels 41 and 54 are free to rotate and the sections $54^a$ and $54^b$ no longer slip, but turn the disk or wheel 54, and thereby the wheel 41. At this time, however, the upper arm 51 upon the opposite side of plate 48 comes in contact with the next block. The purpose of the devices just described is therefore simply to assist in the rotation of shaft 40 and wheel 41, so that said shaft will have commenced to rotate when contact is made with a block 49.

Figures 11, 12, 13, 14, 15, 16:
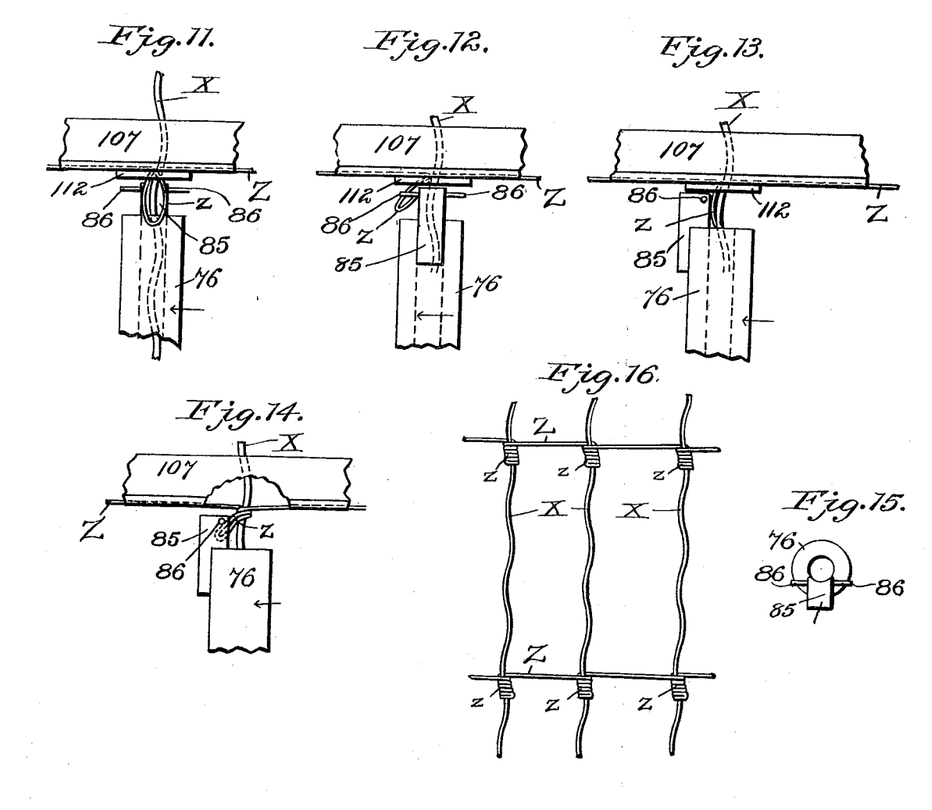
Figs. 11, 12, 13, and 14 are detail views showing the manner in which the twisters operate to wrap the loops of the tie-wires about the runner-wires.
Fig. 15 is an end view of one of the loopers.
Fig. 16 is a detail fragmentary view showing the character of the finished fabric made by the machine.

On the front side of the upper portion of the frame upon which the devices and mechanism just described are mounted and just below the carriage-way $23^a$ is a transversely-arranged series of forwardly-projecting pins or the like 59, which are arranged in vertical pairs, (see Fig. 4,) there being one of these pins for each runner-wire X. The machine illustrated is designed to produce a fabric or fencing of the pattern shown in Fig. 16, wherein the wires X are of gradually-decreasing distance from each other from top to bottom. Consequently the pairs of pins 59 are gradually set closer to each other from the right to the left hand side of the machine, looking at Fig. 4. It is around these pins that the wire which is to form the tie-wires Z is carried by the looping device 45 to form the loops $z$, as hereinafter more fully described, the said device having its path of traverse upon the movement of the carriage 24, adjacent to said pins. (See Fig. 8.)

Figure 4:
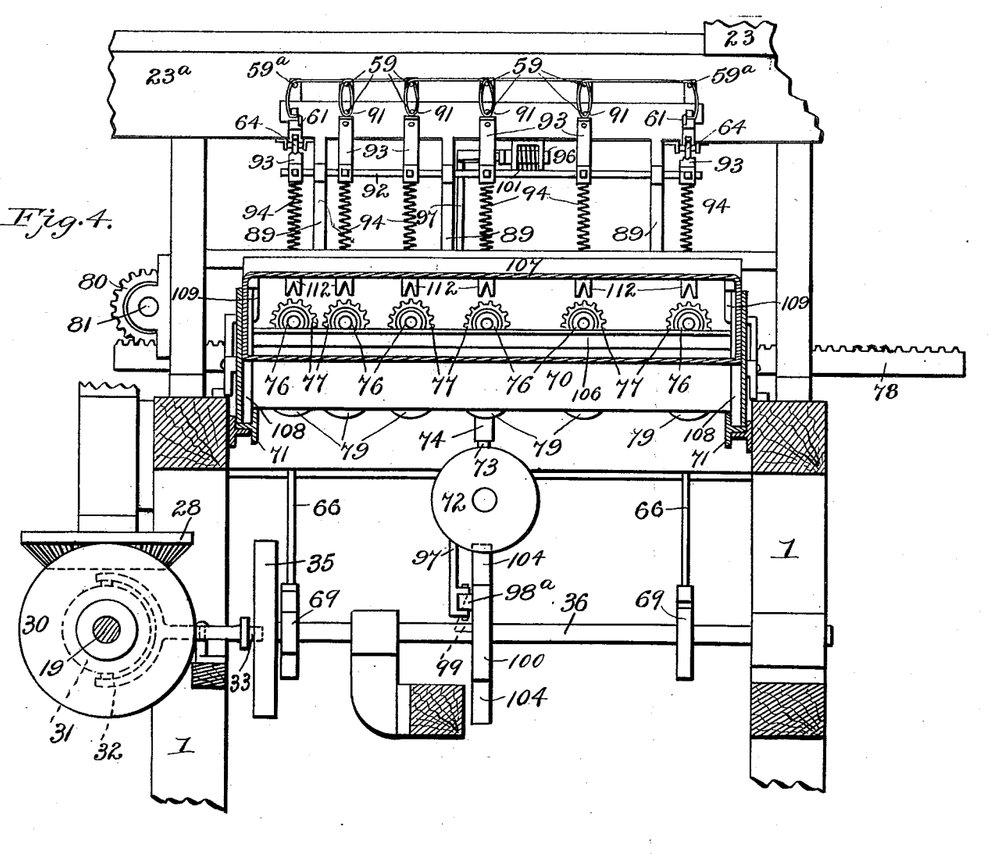
Fig. 4 is a transverse section, partly broken away, on the line $b\,b$ of Fig. 2 and showing a tie-wire on the loop-forming pins.

60 designates pincers or cutters which are for the purpose of cutting the tie-forming wire at the proper points and also for holding the same. One of these devices is provided at each end of the series of pins 59 and below a similar pin $59^a$, as indicated in Fig. 4, and one of them is shown in detail in Figs. 19 and 20. As so shown and as heretofore constructed by us, they consist each of a stationary jaw secured to the under side of the carriage-way $23^a$ and a pivoted movable jaw 61, and which is normally held closed against the fixed jaw by a spring 62. Pivoted at 63, with its horizontal arm in contact with the under side of the jaw 61, in rear of the pivotal point of the latter, is a bell-crank lever 64. Connected to the other arm of this bell-crank lever is a link 65, which is in turn connected to the upper arm of a vertical lever 66, which is intermediately pivoted to a fixed portion of the frame at the point 67. On the lower arm of this lever 66 is a roller 68, which impinges upon a cam 69, fixed to the time-shaft 36. Said cam has a longer raised portion $69^a$ and a shorter raised portion $69^b$, which by their action upon the lever 67 cause, by means of the link connection 65, the bell-crank lever to act upon the jaw 61 to move the latter away from the stationary jaw for the purpose hereinafter described.

Figure 1:
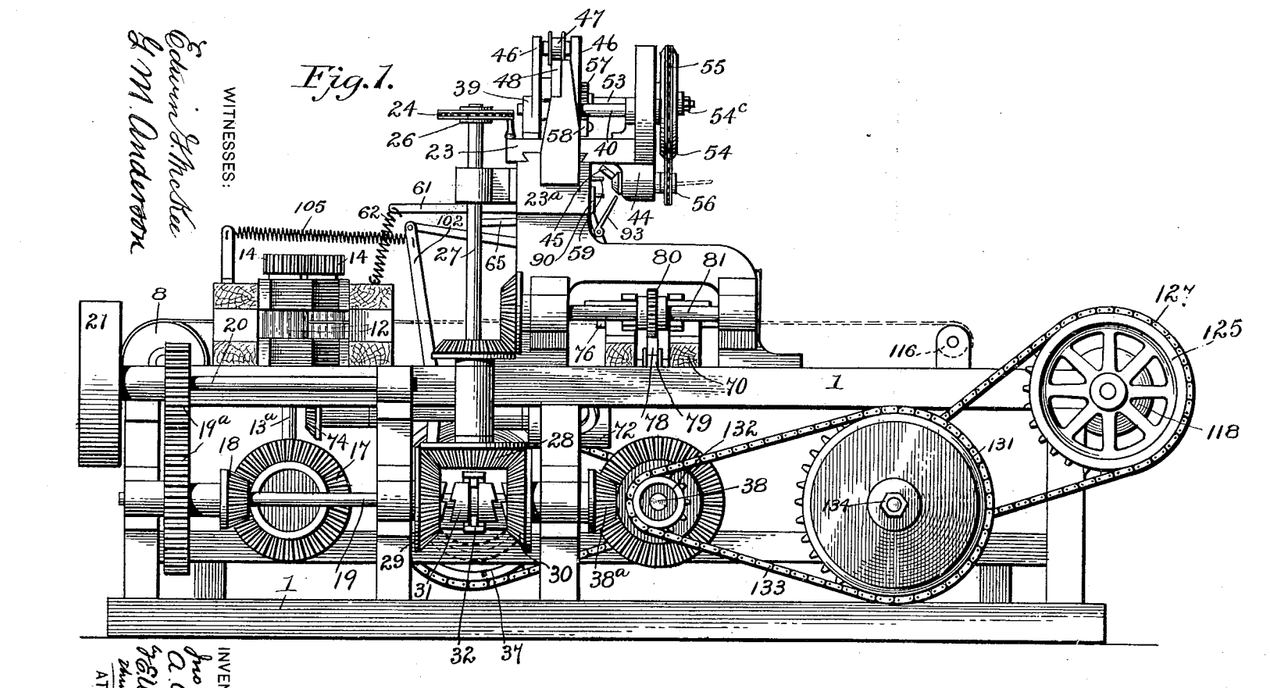
Figure 1 is an end view of the complete machine, with the exception of the bale-holding spools or reels at the rear end.

70 designates a carriage which is supported transversely in front of and below the pins 59 upon the lateral guide rails or ways 71 to reciprocate longitudinally of the machine. This carriage is actuated to its movement by means of a cam 72, mounted upon a shaft 73, which is connected by bevel gear-wheels 74 with the shaft 13ª, which has been described as geared to the transverse shaft 15 and as driving the series of pinions 14 on the shafts of the corrugating-wheels. The groove 72ª of this cam 72 is engaged by a stud or roller 73 on a bar 74, which is connected to the carriage 70. (See Fig. 3.) Upon said carriage 70 is a series of bearings 75, in which are journaled a series of tubular shafts 76, which correspond in number to the number of the pairs of the corrugating-wheels and which are respectively alined therewith. On each of these shafts is a pinion 77, whose teeth are engaged by the teeth of a transversely-reciprocating rack-bar 78, which is common to the series of such pinions and which is supported upon a series of rollers 79, journaled on the carriage 70. This rack-bar is actuated by a gear-wheel 80 on a shaft 81, journaled in bearings 82 at one end of the machine and which is driven by a bevel gear-wheel 83, which meshes with a corresponding wheel 84 on the shelf 27, which has been described as carrying the wheel 26 which drives the chain 24 which actuates the carriage 23. It follows, therefore, that when the direction of motion of the shaft 27 is reversed by the cam-operated clutch-shifting device, which has been described, the direction of motion of the shaft 81, gear-wheel 80, and rack-bar 78 is reversed at the same time. The gear-wheel 80 is loosely splined on the shaft 81, so that during its rotation it can reciprocate on said shaft in agreement with the reciprocation of the carriage 70. (See Fig. 1.)

On the forward end of each tubular shaft 76 is a twisting-lug 85, which is adapted to engage a loop z of a tie-wire Z and wrap the same about the adjacent runner-wire X, in the manner hereinafter described, upon the rotation of said shaft. In said lugs are inclined pins 86, which are for the purpose of preventing the loop from slipping. (See Figs. 11, 12, 13, 14, and 15.)

When a tie-wire has been formed upon the pins 59 in the manner which has been indicated and which will hereinafter be more fully described, it becomes necessary to automatically remove the same from the pins 59 and transfer the same onto the carriage 70 in position for its loops to be engaged by the twisters and wrapped around the runner-wires. We will now describe the means by which such removal and transfer are effected.

Figures 5, 29:
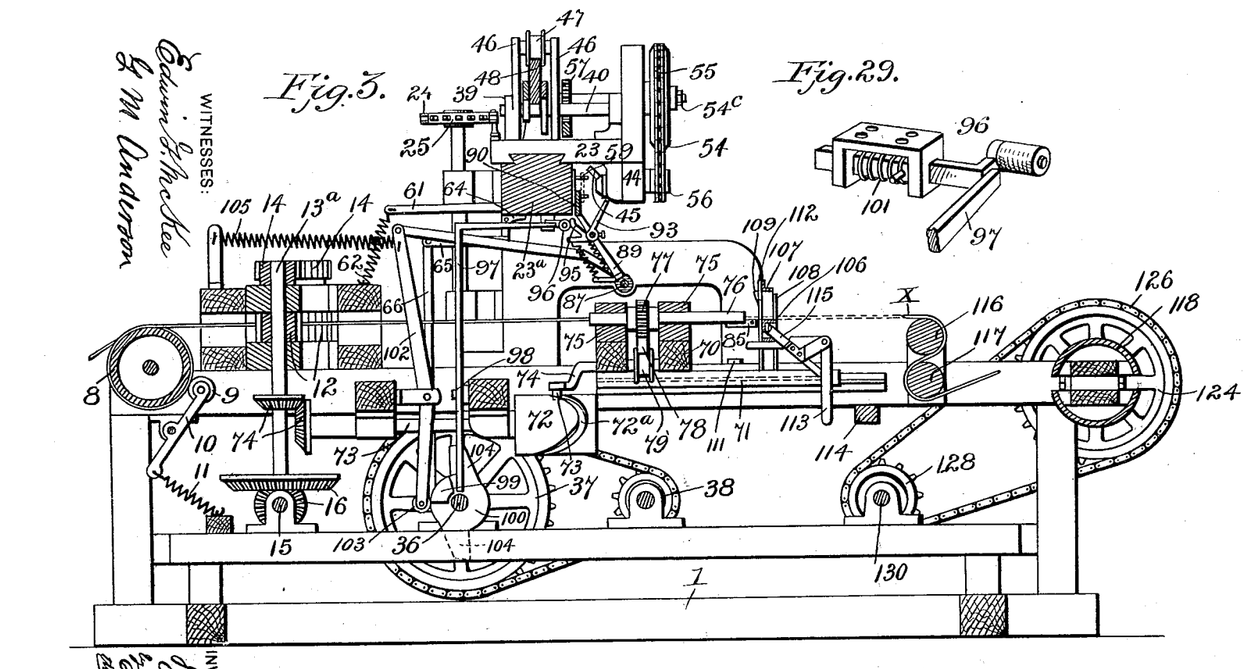
Fig. 5 is a detail view, partly in vertical section and partly in end elevation, showing the operation of the transfer device, its adjuncts, and adjacent parts of the machine.
Fig. 29 is a detail view of the sliding device which controls the operation of the grippers on the transfer-board.

87 is a transverse rock-shaft which is journaled in bearings 88 below and a short distance in front of the pins 59. Secured to this shaft are arms 89, and secured to the upper portions of these arms is a transverse plate or board 90, which we term the "transfer-plate." This plate has a row of perforations 91, which are designed to fit over the lower row of the pins 59, as shown in Figs. 3, 4, and 5. Journaled in the said arms is a second rock-shaft 92, to which are secured a series of upwardly-extending "grippers" or grip-fingers 93, which by the action of springs 94, connected thereto, are adapted to close against the outer face of the transfer-plate 90 and seize the loops z of the tie-wire, (see Figs. 5, 6, and 7,) there being one finger for each of said loops. Said fingers are normally held in the open position shown in Fig. 3 by means of an arm 95 on the shaft 92, which engages a slide device 96 underneath the carriage-way 23ª, and thereby holds the said shaft from coming back to position to close the said fingers. At the proper time, however, said slide is moved laterally out of engagement with the arm 95 by means of a bent lever 97, connected to said device and pivoted at 98, with its lower end carrying a roller 98ª, which is arranged to contact with a projection 99 on the face of a cam 100 on the time-shaft 36. A spring 101 returns said slide device as soon as the roller 98ª leaves the projection on the cam.

The rock-shaft 87 is actuated to move the transfer-plate 90 from its position on the pins 59 to the position on the carriage 70 (shown in Fig. 6) by means of a lever 102, connected thereto (see Fig. 6) and carrying at its opposite and lower end a roller 103, which is designed to be engaged by edge projections 104 of the cam 100 just above described. Springs 105, which are connected to said rock-shaft or to the lever 102, constitute the means for returning the transfer-plate to its position on the pins 59.

Figures 5, 6:
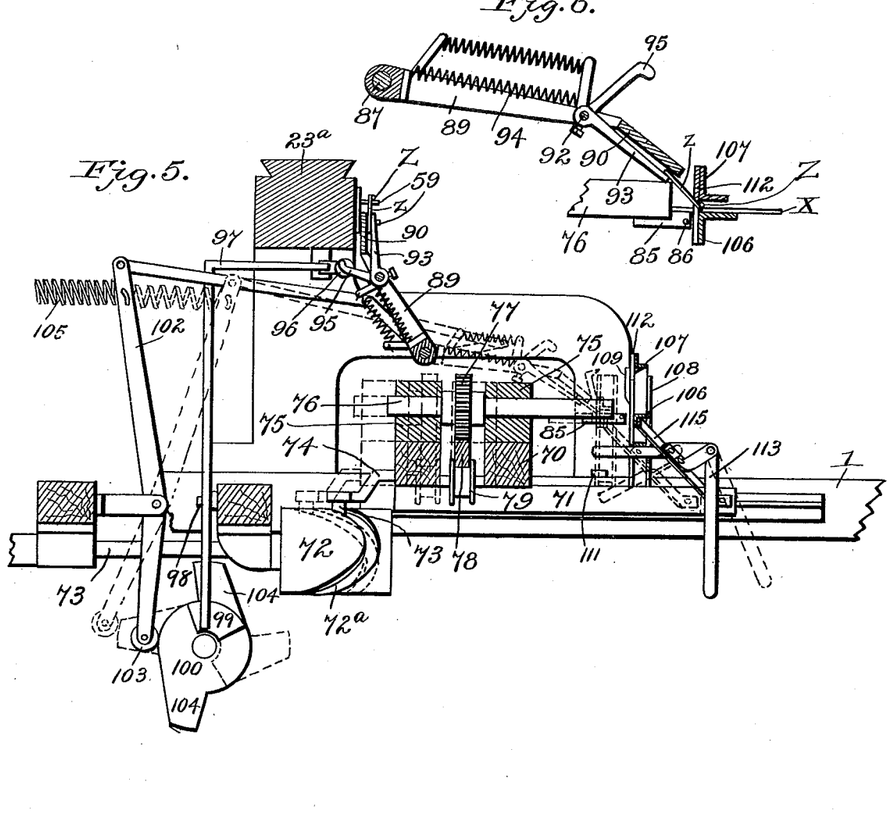
Fig. 6 is a detail view illustrating the position and operation of the transfer device, the grippers, and the twisters.

When the transfer-plate has carried the tie-wire over onto the carriage 70, it is necessary that means shall be provided to catch the tie-wire and its loops z and withdraw the same from the grippers 93 to permit said plate to return at once to position on the pins 59, so that another tie-wire may be formed while the first one is being fastened to the runner-wires. For this purpose we provide on the forward portion of the carriage 70 a fixed transverse grip-plate 106 and above and over the same a similar but movable grip-plate 107, which is slidably mounted at its end portions in vertical guideways 108 on the carriage 70. When said plate 107 is in raised position, (shown in Fig. 17,) it is supported by means of arms 109, which are pivoted at 110 to the posts, in which are formed the guideways 108. The plate 107 rests upon the upper ends of the said arms 109, which are held in proper position by means of springs 110, which bear against their lower end portions. While the transfer-plate 90 is being moved forwardly and downwardly to deposit a tie-wire on the carriage 70 the latter moves backwardly and the lower ends of the arms 109 come in contact with fixed blocks or lugs 111 on the main frame, thereby moving the said arms to withdraw them from underneath the plate 107. The latter then falls by gravity down upon the plate 106, as shown in Fig. 18, and catches the tie-wire between the two plates. Secured to the plate 107 are a series of slotted fingers 112, which catch and straddle the loops $z$, as shown in Fig. 6. As the carriage 70 now again moves forward the loops $z$ are pulled from the grippers 93 and the transfer-plate at once returns to its position on the pins 59. Pivoted to the carriage 70, one at each side, are angle-levers 113, which are connected to the plate 107. As the carriage 70 approaches the limit of its forward movement these levers contact with the frame-piece 114 (or with some other fixed part) and are by such contact moved to raise the plate 107 to position, where it is again caught by and supported on the arms 109 during the return movement of the carriage.

115 designates braces for the plate 106.

Figures 19, 20, 21, 22, 23, 31:
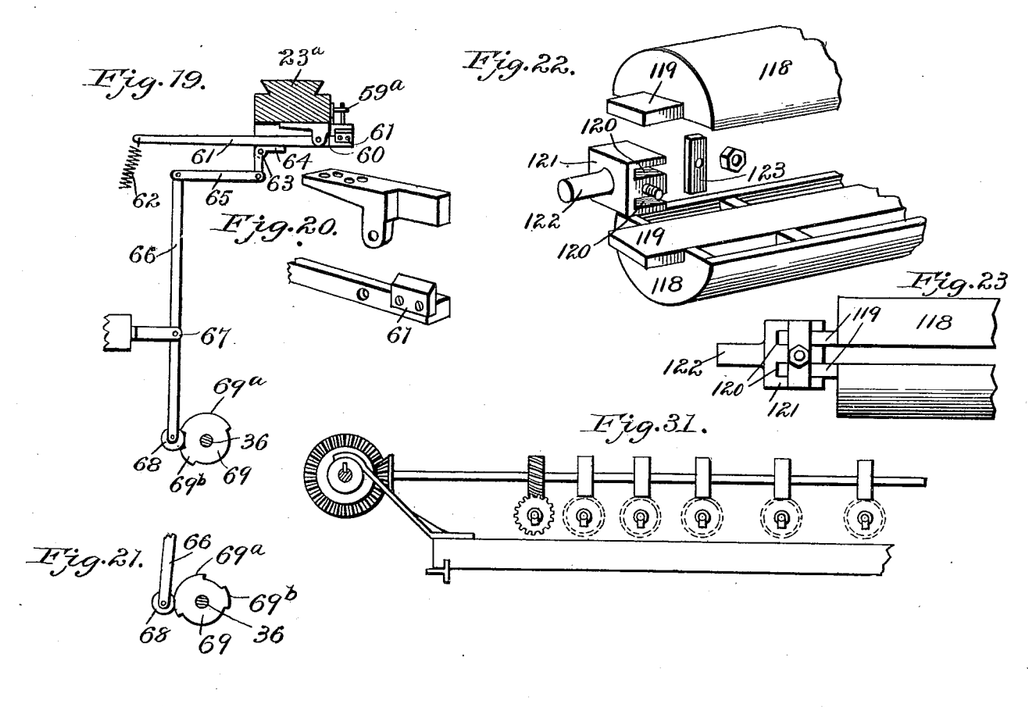
Figs. 19 and 20 are detail views of one of the pincers, Fig. 19 showing the operating devices.
Fig. 21 is a detail view showing, in connection with Fig. 19, the relative positions of the two pincer-operating cams.
Figs. 22 and 23 are detail views of a portion of the winding reel or cylinder.
Fig. 31 is a detail view showing a modification of the means for actuating the twisters.

116 and 117 designate two rollers which are journaled on the main frame one above the other in front of the carriage 70 and over and between which the finished fabric passes, as indicated in Fig. 4, on its way to the baling roll or cylinder 118. The top surface of the roller 116 is in the same horizontal plane as the axes of the tubular twister-shafts 87, so that the pull or draw on the wires will always be in a straight line and will not be affected by the increasing diameter of the bale as it is wound on the drum or cylinder 118. This drum or cylinder is preferably formed in two separated longitudinal sections, as shown in Figs. 22 and 23, having tenons 119 at their ends, which drop into sockets 120 of head-blocks 121, carried by the journals 122 and secured therein by pivoted cleats or buttons 123. This construction permits a cylinder, with its bale, to be quickly removed from the machine when wound to the proper size, and the consequent collapse or falling together of the two sections permits them to be readily withdrawn from the bale. Each of the journals 122 carries a sprocket-wheel 124 or 125, which is connected by a sprocket-chain 126 or 127 with a smaller sprocket-wheel 128 or 129 on a transverse shaft 130. The shaft 130 is shown as being in turn geared by sprocket-wheels 131 and 132 and connecting-chain 133 to the shaft 37, which has been described as the shaft which actuates the time-shaft 36. The sprocket-wheel 131 is a compound wheel, similar in character to the wheel 54 before described, with an interposed friction sprocket-disk 131$^a$. The object of this construction is to enable the wheel 131$^a$ and its attached wheel 128 to slip on the shaft 130 in the event of there being an obstruction to the operation of the machine, so that the drum or cylinder 118 may cease to turn and injury or breakage may be avoided; also, for the purpose of providing for the slower rotation of the said cylinder as the diameter of the bale thereon increases.

134 is a nut for adjusting the degree of friction.

Although the operation of the several parts of the machine has been more or less fully described above, we will now give a general description of the operation of the machine as a whole.

The runner-wires X from the bales on the reels or spools 2 pass around the tension drum or cylinder 8 and from thence forward and through between the respective pairs of corrugating-wheels 12, whereby they are given a corrugated or wave-like form. They then pass forwardly and through the respective tubular shafts 76, at the front ends of which the tie-wires are applied and fastened thereto. Supposing the carriage 24 to be at the right-hand side of the machine, (looking at the drawings,) with the wire which is to form the tie-wires Z coming in through the tubular axle 43 of the looper-pinion 42 and the machine in operation, the tie-wires are formed and applied in the following manner: The movement of the carriage 24 to the left first carries the tie-forming wire through the pincers 60 at the right-hand side of the machine and around the pin 59$^a$. At this time the said pincers are in open position by reason of the fact that the roller 68 of the lever 66 is traveling on the shorter raised portion 69$^b$ of the cam 69 on the time-shaft 36. As soon as the roller leaves the said portion of the cam the pincers close and hold the end of the wire, cutting it also at the proper point. By the continued movement of the carriage 24 and the periodical operation of the looping device, as before described, the wire is carried to and is successively looped about the several pairs of pins, as shown in Fig. 4. By the time the looping device 45 has reached the pincers 60 at the left-hand side of the machine said pincers have been opened by the longer portion 69$^b$ of the cam 69 at that end, said cam being set oppositely on the shaft 36 to the corresponding cam at the right-hand end, (see Figs. 19 and 21,) and the wire is caught, cut, and held thereby, as seen in Fig. 4. The cam 35 on the said time-shaft is now in such position that the clutch-sleeve 31 is held out of engagement with both wheels 29 and 30 and the carriage 24 remains stationary for a short time at the left-hand side of the machine. At this time the cam 72 is moving the carriage 70 rearward, (the pitch of the groove 72$^a$ thereof being such that said carriage is brought back in one-fifth less time than is occupied in its forward movement,) the rack-bar 78 is stationary, the grip-bar 106 is in raised position, and the transfer device is in the position shown in Fig. 4 in dotted lines and in full lines in Fig. 6. The cam 100 at this time acts to move the sliding device 96 out of engagement with the arm 95, and the fingers 93 at once close, by the action of their springs, upon the tie-wire. The cam 100 now acts to move the transfer-plate 90 forwardly and downwardly, (the pincers having in the meantime opened,) thereby pulling the tie-wire off from the pins 59 and laying it upon the carriage 70, which has reached the rearmost limit of its travel. The arms 109 as said carriage approaches this position come in contact with the blocks or lugs 111, thereby releasing the grip-plate 107, which falls upon and catches the tie-wire, as shown in Fig. 6. The cam 100 now acts to reverse the movement of the carriage, and as the latter moves forwardly the loops $z$ of the tie-wire are pulled away from the grippers 93 and the transfer-plate returned to the position shown in Fig. 5, where the grippers are now opened by the return movement of the sliding device 96. Shortly after the carriage 70 commences its forward movement the cam 35 operates to reverse the movement of the driving-gear for the carriage 34, which starts upon its return movement to the right. At the same time the driving-gear for the rack-bar 78 is set in operation, and said bar (which has remained stationary during the rearward movement of the carriage 70) operates the series of pinions 77, and thereby rotates the tubular shafts 76 and the twisting-lugs 85 carried by such shafts. These lugs engage the loops $z$ and wrap the same around the runner-wires X. As the carriage 70 approaches the limit of its forward movement the levers 113 contact with the bar or stops 114, (see Fig. 3,) and thereby raise the grip-bar 107 to its elevated position, where it is again caught and held by the arms 109, as shown in Fig. 17. During the forward movement of the carriage 70 carriage 24 has been continuing its movement to the right and is forming the loops $z$ of another tie-wire, the pincers 60 at the left-hand end of the machine having been opened and closed to cut and catch the new tie-wire by the operation of the portion $69^a$ of its cam 69. The carriage 24 reaches the right-hand end of the machine at the time the carriage 70 reaches the limit of its forward movement, at which time the cam 35 again operates the clutch-sleeve 31 to check the movement of carriage 24, which again remains stationary while the carriage 24 moves rearward and the tie-wire is shifted onto the carriage 70. The operation described is now repeated and is continued without stoppage of the machine until a bale of finished fabric of the desired size is wound upon the cylinder 118.

It will be seen from the foregoing that the entire operation is carried on automatically by the machine and that owing to the movement of the carriage 70 the tie-wires are applied without stopping the movement of the runner-wires. It will be observed also that by the described intermittent movement of the rack-bar which actuates the twisters and which remains stationary during the rearward movement of the carriage 70 the loops of adjacent tie-wires are wrapped in opposite directions. This feature improves the character of the fabric or fencing formed by the machine and is also necessary in order to make a proper wrapping of the loops, since the carriage 24, in moving from left to right, crosses the wires of the loops $z$ in the opposite direction from that in which they are crossed during the movement of said carriage from right to left. In lieu of the said rack-bar we may employ a spiral gear or worm-shaft actuated in the same manner as the rack-bar. (See Fig. 31.)

We do not desire to limit ourselves to the particular construction and combination of parts described, as the same may be changed in many ways without departing from the spirit and scope of our invention.

Having thus described our invention, what we claim as new, and desire to secure by Letters Patent, is—

1. In a machine of the class described, the combination with means for feeding the horizontal or runner wires, of mechanism for wrapping around said wires simultaneously the intermediate and end loops of stay or tie wires laid upon said horizontal or runner wires, substantially as specified.

2. In a machine of the class described, the combination with means for feeding the runner-wires, of a tie-wire feeding or supplying device, means for forming the same with intermediate loops, and for cutting the same into lengths, transfer devices for applying the tie-wires to the runner-wires, and twisting devices for simultaneously winding or wrapping the several loops of the tie-wires about the respective runner-wires, substantially as specified.

3. In a machine of the class described, the combination with means for feeding the runner-wires, of tie-wire-forming devices, transfer devices for applying the same to the runner-wires, and twisting devices for catching the loops of the tie-wires and wrapping or winding them simultaneously about the runner-wires, substantially as specified.

4. In a machine of the class described, the combination with means for feeding the runner-wires, of tie-wire-forming devices, transfer devices for shifting the tie-wires from the forming devices to position on the runner-wires, twisters for catching the loops of the tie-wires and simultaneously wrapping or winding them about the runner-wires, and means for operating said twisters at intervals, substantially as specified.

5. In a machine of the class described, the combination with means for feeding the runner-wires, of tie-wire-forming devices, a longitudinally-reciprocating carriage, means for reciprocating said carriage, transfer devices for shifting the tie-wires from the forming devices to the said carriage, and twisters mounted upon the said carriage and arranged to seize the loops of said tie-wires and wrap them simultaneously around the several runner-wires, substantially as specified.

6. In a machine of the class described, the combination with means for feeding the runner-wires, of tie-wire-forming devices, a longitudinally-reciprocating carriage, means for reciprocating the same, transfer devices for shifting the tie-wires from the forming devices to the said carriage, a reciprocating grip for holding the tie-wires on said carriage, and twisters arranged to catch loops of said tie-wires and wrap them about the runner-wires, substantially as specified.

7. In a machine of the class described, the combination with means for feeding the runner-wires, of tie-wire-forming devices, a longitudinally-reciprocating carriage, means for reciprocating the same, transfer devices for shifting the tie-wires from the forming devices to the said carriage, the twisters rotatably mounted on said carriage, means for simultaneously actuating the said twisters at the proper times, a winding or take-up roll or reel for the finished fabric, and intermediate guiding and feeding rollers between the said carriage and the roll or reel, substantially as specified.

8. In a machine of the class described, the combination with a series of wire-holding spools or reels, a series of intergeared corrugating wheels, and tension devices between said spools or reels and the corrugating wheels, of tie-wire-forming devices, and means for applying and fastening the said tie-wires to the horizontal or runner wires, substantially as specified.

9. In a machine of the class described, the combination with a series of wire-holding spools or reels, a series of intergeared corrugating wheels, and tension devices interposed between the said spools or reels and the corrugating wheels, of tie-wire-forming devices, transfer devices for shifting the tie-wires from the forming devices to position on the corrugated runner-wires, and twisting devices arranged to catch the loops of the tie-wires and simultaneously wrap them around the several runner-wires, substantially as specified.

10. In a machine for making wire fencing, wire-corrugating devices consisting of small corrugated wheels arranged in pairs and intergearing one with another, substantially as specified.

11. In a machine for making wire fencing, the combination of a fixed support having a series of pins arranged in pairs, a reciprocating carriage, and means for reciprocating the same, and a device mounted upon said carriage for carrying wire successively from one pair of pins to another, and for looping it around the said pins, substantially as specified.

12. In a machine for making wire fencing, the combination of a fixed support having a series of pins arranged in pairs, a reciprocating carriage, and means for reciprocating the same, and a device mounted upon said carriage for carrying wire successively from one pair of pins to another and for looping it around the said pins, together with means for cutting said wire at the proper points, substantially as specified.

13. In a machine for making wire fencing, the combination of a fixed support, having a series of projecting pins arranged in pairs, a reciprocating carriage, and means for actuating the same, a wheel on said carriage having a tubular axle or shaft bent at one end to travel around the pairs of pins successively as the carriage advances and means for periodically rotating the said wheel, substantially as specified.

14. In a machine for making wire fencing, the combination of a fixed support, having a series of projecting pins arranged in pairs, a reciprocating carriage and its actuating mechanism, a gear wheel or pinion mounted on said carriage and having a tubular axle bent at one end, a second and larger gear-wheel in mesh with the first-named gear-wheel, and means for periodically rotating said larger gear-wheel as the carriage advances, substantially as specified.

15. In a machine for making wire fencing, the combination of a fixed support having a series of pins or the like arranged in pairs, a carriage arranged to have a traverse movement adjacent to said pins, and a wire carrying and looping device arranged to carry wire successively to the several series of pins and to loop it around the same, substantially as specified.

16. In a machine for making wire fencing, the combination of a fixed support, having a series of pins arranged in pairs, a carriage, means for reciprocating the same, a gear-wheel having a tubular axle formed with a bent end adapted to rotate about each pair of said pins as the carriage moves, a second gear-wheel meshing with the first-named wheel and having four times as many teeth, quartering-arms on the shaft of said second gear-wheel, and two series of fixed horizontal contact-blocks arranged alternately of each other, each series being arranged to be engaged by one pair of said arms, substantially as specified.

17. In a machine for making wire fencing, the combination with a rotary looping device, a gear-wheel arranged to give said device a complete rotation upon each one-fourth rotation of the gear-wheel, the right-angularly-arranged arms on the shaft of said gear-wheel and the two series of horizontal contact-blocks arranged alternately of each other and adapted to be engaged by the said arms in the manner described, and a reciprocating carriage which carries the said looping device and gear-wheel, substantially as specified.

18. In a machine for making wire fencing, the combination with loop-holding pins the reciprocating carriage, and means for operating the same, of the rotary looping device mounted on said carriage and adapted to loop the wire around said pins, and means for periodically rotating said device as the carriage advances, substantially as specified.

19. In a machine for making wire fencing, the combination with loop-holding pins the reciprocating carriage and means for actuating the same, of the rotary looping device mounted on said carriage and adapted to loop the wire around said pins, a gear-wheel for rotating said looper, and means for periodically actuating said gear-wheel, substantially as specified.

20. In a machine for making wire fencing, the combination with the reciprocating carriage and means for actuating the same, of the rotary looping device mounted on said carriage, the gear-wheel for actuating said looper, and having a shaft provided with four arms arranged at ninety degrees to each other, the two series of fixed alternating blocks arranged to be engaged by the said arms, the stationary rack, the shaft mounted on the carriage, and having a pinion engaging the said rack, the wheel having a frictional connection with said shaft, and a driving connection between said wheel and the shaft of the looper, substantially as specified.

21. In a machine for making wire fencing, the combination with the reciprocating carriage, means for operating the same, the rotary looper mounted thereon and means for periodically rotating said looper, of secondary actuating devices therefor, comprising a stationary rack, a shaft mounted on the carriage, a pinion on said shaft engaging said rack, the sprocket-wheel having a frictional connection with the said shaft, and a sprocket-chain connecting the said sprocket-wheel with the shaft of the looper, substantially as specified.

22. In a machine for making wire fencing, the combination with the loop-forming pins and means for looping the tie-wire around the same, and for cutting said wire at the proper points, of the swinging transfer-plate arranged to remove the formed tie-wire from said pins and carry it into position to be applied to the runner-wires, substantially as specified.

23. In a machine for making wire fencing, the combination with the loop-forming pins and means for looping the tie-wire upon said pins, of the swinging transfer-plate, means for actuating the same toward and away from the said pins, the series of gripping-fingers carried by the transfer device, and means for opening and closing the said fingers at the proper times, substantially as specified.

24. In a machine for making wire fencing, the combination with the looping-pins and looping devices, of the transfer-plate perforated to admit said pins, the rock-shaft which carries said plate, a cam device for actuating said shaft, to move the plate in one direction, and springs for returning said plate, substantantially as specified.

25. In a machine for making wire fencing, the combination with the rock-shaft, the arms connected thereto, the transfer-plate carried by said arms, and means for actuating said shaft, of the rock-shaft journaled in the said arms, the grippers carried by said shaft, springs for closing said grippers, a movable device for opening and holding open said grippers, and means for moving said device into and out of position to open said grippers, substantially as specified.

26. In a machine for making wire fencing, the combination with the rock-shaft, the arms connected thereto, the transfer-plate carried by the said arms, a cam and connecting devices to move said rock-shaft in one direction, springs to move it in the opposite direction, a rock-shaft journaled in said arms, gripping-fingers carried by the said shaft, springs for holding said fingers in closed position, a sliding device for holding the said fingers in open position and for opening the same, a connection between the said device and the said cam, for moving the device in one direction, and a spring for moving it in the opposite direction, substantially as specified.

27. In a machine for making wire fencing, the combination with looping-pins and loop-forming devices, of a longitudinally-reciprocating carriage, rotary twisting devices mounted on said carriage, and a swinging transfer device arranged to remove the formed tie-wire from said pins and place it upon said carriage in position for its loops to be engaged by said twisters, substantially as specified.

28. In a machine for making wire fencing, the combination with looping-pins and loop-forming devices, of a longitudinally-reciprocating carriage, rotary twisting devices mounted on said carriage and a swinging transfer device arranged to remove the formed tie-wire from said pins and place it upon said carriage in position for its loops to be engaged by said twisters, and a reciprocating device for gripping the loops of the said tie-wires and holding the same while the twisters are in operation, substantially as specified.

29. In a machine for making wire fencing, the combination with looping-pins and loop-forming devices, of a longitudinally-reciprocating carriage, the rotary twisters mounted thereon, the swinging transfer device having the gripping-fingers, its actuating devices, and the grip-plate arranged to catch the tie-wire as it is deposited on the said carriage by the transfer device and withdraw said wire from the said fingers as the carriage moves, substantially as specified.

30. In a machine for making wire fencing, the combination with a series of looping-pins mounted on a fixed support, a reciprocating carriage, a looping device on said carriage, arranged to loop the tie-wire around the said pins, means for automatically reversing the movement of said carriage, a second carriage arranged to reciprocate in a direction at right angles to the first-named carriage, a series of rotary twisters mounted on the second carriage and having each a gear-wheel, a reciprocating rack-bar common to the series of such gear-wheels, and engaging the same, and means whereby the movement of the rack-bar is reversed at the same time that the movement of the first-named carriage is reversed, together with a transfer device for carrying the formed tie-wire from the looping-pins to the second carriage, substantially as specified.

31. In a machine for making wire fencing, the frame having the transverse guide or slideway, looper carrying and actuating carriage mounted to reciprocate thereon, a sprocket-chain having its end portions connected to said carriage, a driving-shaft and wheel for said chain, and means for automatically reversing the direction of movement of said shaft, substantially as specified.

32. In a machine for making wire fencing, a transverse guide or slideway, the looper carrying and actuating carriage mounted to reciprocate thereon, a sprocket-chain having its end portions connected to said carriage, a driving-shaft and wheel for said chain, gear-wheels for driving said shaft in opposite directions a clutch device for bringing either one of said wheels into driving engagement, and a cam-operated clutch-shifting device, substantially as specified.

33. In a machine for making wire fencing, the frame having a transverse guide or slideway, the looper carrying and actuating carriage mounted to reciprocate thereon, a sprocket-chain having its end portions connected to said carriage, a driving-shaft and wheel for said chain, gear-wheels for driving said shaft in opposite direction, a clutch device for bringing either one of said wheels into driving engagement, and a cam adapted to operate said clutch-shifting device at intervals, and to hold the same with the clutch in inoperative position between such intervals, substantially as specified.

34. The combination with tie-wire forming and transfer devices, of a reciprocating carriage, a series of rotary twisters mounted thereon, and means for actuating the entire series of twisters simultaneously and alternately in opposite directions, substantially as specified.

35. The combination with the longitudinally-reciprocating carriage upon which the twisting devices are mounted, and means for actuating the same, of a reciprocating wire-grip adapted to hold a tie-wire on said carriage while it is being fastened to the runner-wires, substantially as specified.

36. The combination of runner-wire-feeding devices, tie-wire-forming devices arranged to form a looped tie-wire transversely of the series of runner-wires, a longitudinally-reciprocating carriage, a series of twisting devices mounted thereon, a shifter for removing the tie-wire from its forming devices, and placing it upon said carriage with its loops adjacent to said twisters, and a gripping device for holding the said tie-wire during the operation of the twisting devices, substantially as specified.

37. The combination with the reciprocating twister-carrying carriage, and its stationary grip-plate, of the vertically-reciprocating grip-plate mounted in guides on said carriage, means for supporting said plate in raised position, means for withdrawing said supports at the proper time, and means for returning said plate to raised position, substantially as specified.

38. The combination with the reciprocating twister-carrying carriage, and its stationary grip-plate, of the vertically-movable grip-plate mounted in guides on the said carriage, pivoted spring-pressed arms which support said plate in raised position, means for engaging and moving said arms to release said plate, and automatically-operating lever devices for returning said plate to raised position, substantially as specified.

39. The combination with the reciprocating twister-carrying carriage, and its stationary grip-plate, of the vertically-movable grip-plate mounted in guides on the said carriage, pivoted spring-pressed arms which support said plate in raised position, means for engaging and moving said arms to release said plate, and automatically-operating lever devices for returning said plate to raised position, together with a series of slotted fingers secured to said movable plate, substantially as specified.

40. The combination with the reciprocating looper-carriage and the loop-forming pins, of the pincers at each end of the series of said pins, and means for automatically operating the same at intervals to cut and catch the end portions of the tie-wires, substantially as specified.

41. The combination with the reciprocating looper-carriage, and the series of loop-forming pins, of the pincers at each end of the series of pins, rotary cams, and connections between said cams and the movable jaws of the said pincers, whereby the latter are opened at intervals, together with springs for normally holding said jaws closed, substantially as specified.

42. The combination with the reciprocating looper-carriage, and the series of loop-forming pins, of a time-shaft, two cams thereon set oppositely to each other, and having each a longer and a shorter raised position, a pair of pincers at each end of the series of pins, connections between the said cams and the movable jaws of the pincers for opening the same at intervals, and springs for closing said jaws, substantially as specified.

43. In a machine for making wire fencing, the combination of a main driving-shaft, a time-shaft driven therefrom, a reciprocating looper-carriage driven by said driving-shaft, interposed gear for actuating said looper-carriage in opposite directions, a cam, mounted on the time-shaft, a clutch-shifting device operated by said cam and controlling the operation of said interposed gear, a reciprocating twister-carrying carriage, and twisting devices thereon, a cam for operating the same, and timed with respect to the first-named cam, reversible gear for actuating the said twisters, said gear being also controlled by the said clutch-shifting device, and timed with respect to the operation of the gear which operates the twister-carriage, substantially as specified.

44. The combination with the longitudinally-reciprocating carriage and its twisting devices, of the reciprocating rack-bar which operates the said twisters, the driving-shaft which actuates the said rack-bar, the gear-wheel slidingly mounted on said shaft, and engaging the teeth of said rack-bar, and means for automatically reversing the direction of motion of said rack-bar and for holding the same inoperative during the return movement of said carriage, substantially as specified.

45. The combination of a reciprocating looper-carriage, its loop-forming devices, the stationary pins, a twister-carrying carriage mounted to reciprocate at right angles to the movement of the looper-carriage, and actuating devices for the said carriage whereby the looper-carriage remains stationary during the rearward movement of the twister-carriage, substantially as specified.

46. In a machine for making wire fencing, means for feeding the runner-wires, a transversely-reciprocating looper-carriage, devices thereon and in connection therewith for forming in the wire fed by said carriage a series of loops, a longitudinally-reciprocating twister-carriage, the twisters thereon, a swinging transfer device for shifting the formed tie-wire from the loop-forming devices to the twister-carriage, a reciprocating wire-grip on said last-named carriage, and means for actuating said carriages whereby the looper-carriage remains stationary during the return movement of the twister-carriage, substantially as specified.

47. In a machine for making wire fencing, the combination of a series of wire-holding reels or spools, a series of corrugating-wheels arranged in pairs, tension devices interposed between said reels or spools, and the corrugating-wheels, means for forming a looped tie-wire and for applying the same to the corrugated runner-wires during their forward movement, a winding cylinder or roll for the finished fabric, and guide and feed rollers between the tie-wire-applying devices and the winding cylinder or roll, substantially as specified.

In testimony whereof we affix our signatures in presence of two witnesses.

ALLEN C. SHIMER.
JOHN Q. SHIMER.

Witnesses for A. C. Shimer:
GEORGE H. PARMELEE,
EDWIN G. MCKEE.
Witnesses for J. Q. Shimer:
D. H. FERNANDES,
KATE CHIPMAN.